(No Model.) 3 Sheets—Sheet 1.

G. R. BUTLER.
MACHINE FOR MAKING INSULATOR PINS.

No. 536,827. Patented Apr. 2, 1895.

Witnesses:
O. F. Barthet.
L. T. Whittemore

Inventor:
George R. Butler,
By Thos. S. Sprague & Son
Attorneys.

THE NORRIS PETERS CO., PHOTO-LITHO., WASHINGTON, D. C.

(No Model.) 3 Sheets—Sheet 2.
G. R. BUTLER.
MACHINE FOR MAKING INSULATOR PINS.

No. 536,827. Patented Apr. 2, 1895.

Witnesses:
O. F. Barthel.
L. J. Whittemore.

Inventor:
George R. Butler;
By Thos. H. Sprague & Son
Attorneys.

(No Model.) 3 Sheets—Sheet 3.
G. R. BUTLER.
MACHINE FOR MAKING INSULATOR PINS.

No. 536,827. Patented Apr. 2, 1895.

Witnesses:
O. F. Barthel
L. J. Whittemore

Inventor:
George R. Butler,
By Thos. S. Sprague & Son
Attorneys.

UNITED STATES PATENT OFFICE.

GEORGE R. BUTLER, OF SANDUSKY, OHIO.

MACHINE FOR MAKING INSULATOR-PINS.

SPECIFICATION forming part of Letters Patent No. 536,827, dated April 2, 1895.

Application filed August 6, 1894. Serial No. 519,565. (No model.)

*To all whom it may concern:*

Be it known that I, GEORGE R. BUTLER, a citizen of the United States, residing at Sandusky, in the county of Erie and State of Ohio, have invented certain new and useful Improvements in Machines for Making Insulator-Pins, of which the following is a specification, reference being had therein to the accompanying drawings.

The invention consists in the peculiar construction of a machine comprising rotating mandrels for turning the work, devices for shaping the blank, spirally grooving the blank and boring the blank. Further in the peculiar arrangement and combination of these parts and in the construction of a work holder or feed table, and further in the peculiar construction, arrangement and combination of the various parts.

Figure 1:
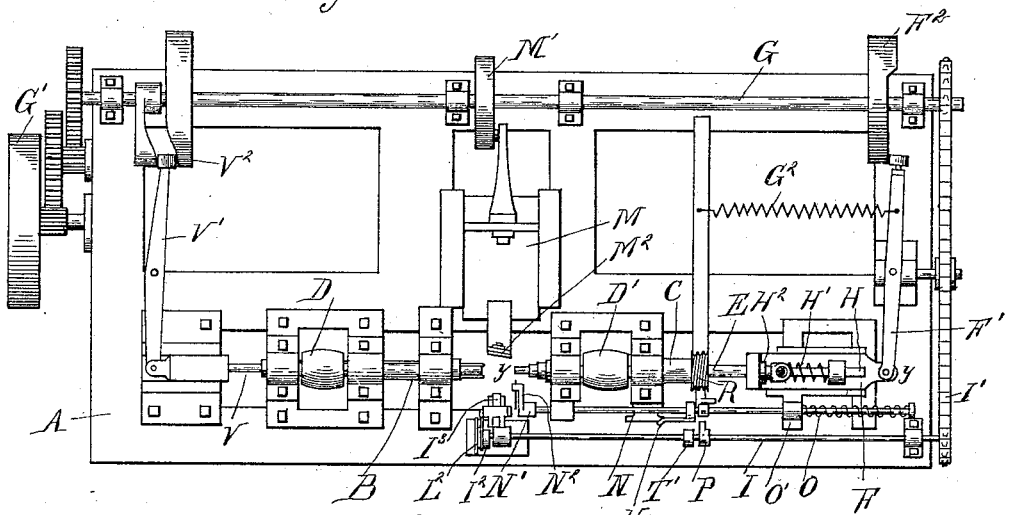
Figure 2:
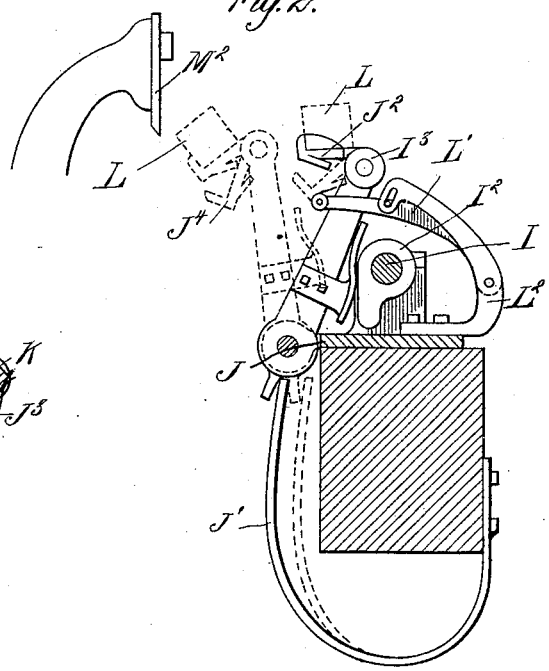
Figure 3:
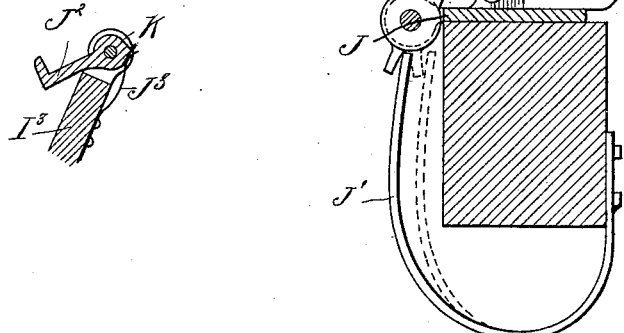
Figure 4:
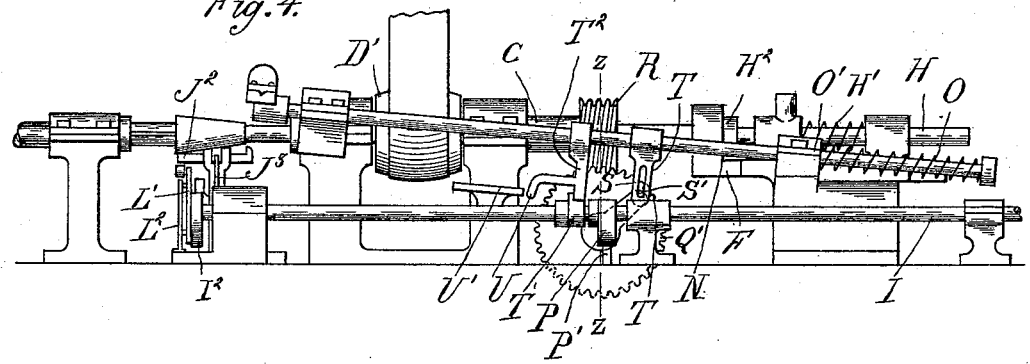
Figure 7:
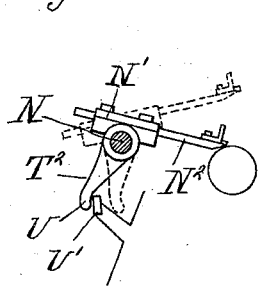
Figure 6:
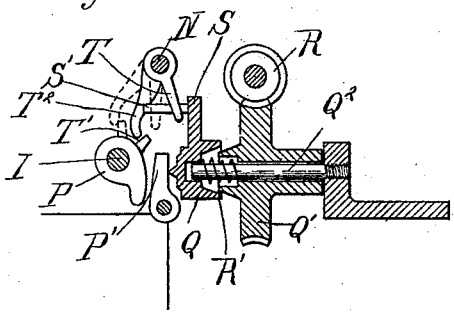
Figure 5:
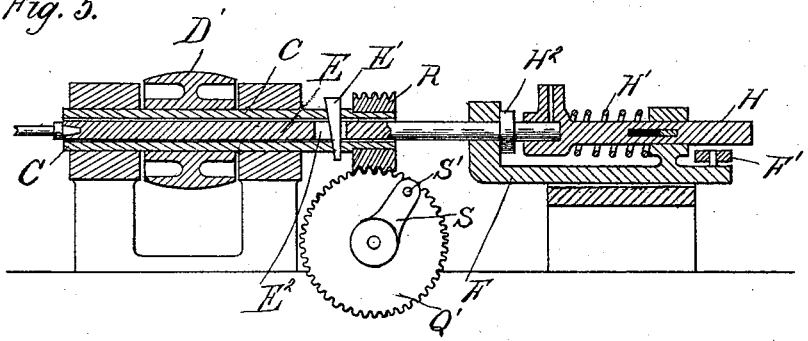
Figure 8:
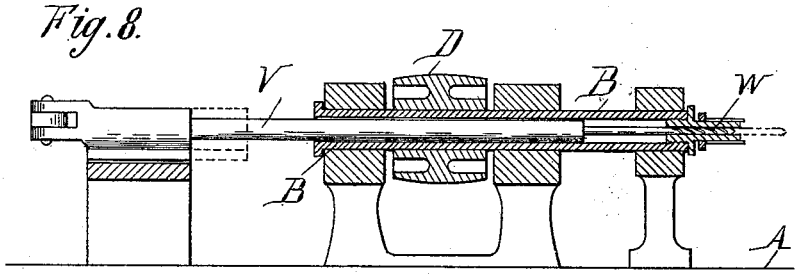
Figure 9:
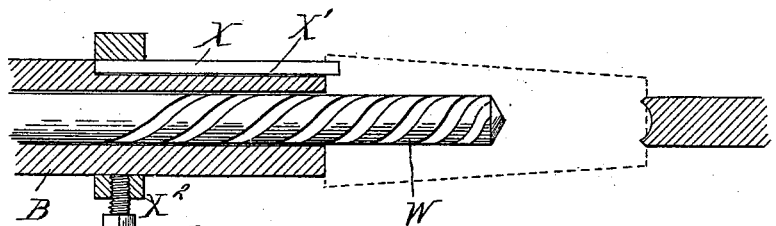
Figure 10:
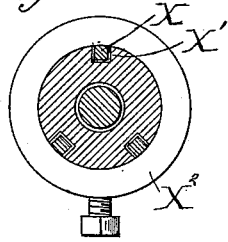
Figure 11:
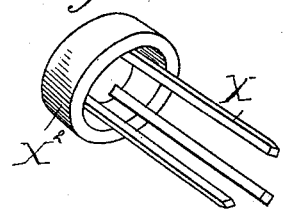
Figure 12:
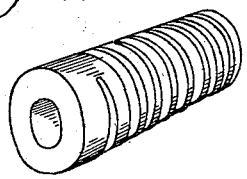

In the drawings, Figure 1 is a top plan view of my improved machine. Fig. 2 is a cross section centrally of the machine showing the construction of the work holder and its actuating devices. Fig. 3 is a detail section through the rock arm and the work holder. Fig. 4 is a side elevation of the machine omitting the left hand end. Fig. 5 is a section on line $y\ y$ Fig. 1. Fig. 6 is a section on line $z\ z$ Fig. 4. Fig. 7 is a section illustrating the grooving cutter and showing it as in operation. Fig. 8 is a longitudinal section through one of the mandrels illustrating the boring tool. Fig. 9 is an enlarged section of the end of the mandrel shown in Fig. 8, showing the boring tool in the blank. Fig. 10 is a section through the end of the mandrel. Fig. 11 is a detached perspective view of the holding teeth or pins of this mandrel. Fig. 12 is a perspective view of the finished article.

A is the frame of the machine, having suitable bearings in which are journaled the hollow mandrels B and C, both being driven by pulleys D D'. The hollow mandrel B forms one rotating center while the hollow mandrel C has an interior spindle E, which carries the other center, and which is longitudinally movable in its mandrel. The spindle E is driven by its mandrel through the key E' which passes through bearings in the mandrel and through a longitudinal slot $E^2$ in the spindle. The outer end of this spindle is journaled in a bearing in the block F, slidingly secured in bearings on the frame. This block is reciprocated by the lever F' connected at one end to the block, and at the other end bearing against a cam face on the wheel $F^2$ on the shaft G driven through intermediate drive mechanism from the drive pulley G'.

$G^2$ is a spring to hold the lever constantly in engagement with the cam face on the wheel.

The spindle E has a spring end bearing which I have shown comprising the thrust block H, in which engages the end of the spindle, and a spring H' between the bearing in which the block slides, and an enlargement on the block itself.

$H^2$ is a collar on the spindle beside its bearing on the block F.

It is evident from this construction of parts, that the spindle may be continuously driven from the pulley D' and be intermittently, longitudinally reciprocated from the cam wheel, $F^2$, and the connections described, and that in case of any undue pressure the spindle may yield longitudinally by compressing the spring H'.

I is a shaft driven by the sprocket chain I' from the shaft G. On the shaft I is the cam $I^2$.

$I^3$ is a rock arm arranged beside the shaft I and pivoted to a bracket J secured to the frame at a point between the mandrels. This rock arm is held normally in contact with the cam $I^2$ by means of a spring J'.

$J^2$ is a work holder pivoted in the upper end of the rock arm $I^3$.

$J^3$ is a spring bearing on flat faces K on the hub of the work holder. The rotation of the cam $I^2$ rocks the arm $I^3$, so that the blank which is shown in dotted lines at L will be between the centers. At this moment, the spindle E is moved inward by the lever F' and the blank is clamped between the two movable spindles and rapidly rotated. The rotation of the blank will overcome the friction of the spring $J^3$ and throw down the work holder into the position shown in dotted lines at $J^4$ in Fig. 2. As the cam $I^2$ continues to rotate the spring J' will rock the rock arm to the position shown in full lines in Fig. 2. As the cam turns it strikes the lifting arm L' pivoted in the bracket $L^2$ beside the cam and this lifting arm L' strikes on the under side of the work holder and lifts it to its initial position, where it is held by the tension of the spring $J^3$. As soon as the blank is clamped between the mandrels the sliding head M arranged on the side of the machine opposite the feeding table is moved up by means of the grooved cam M' on the shaft G, so that the cutter M² will engage with the blank and trim it to the desired circular tape-ring form and will then withdraw. As soon as this is accomplished the threader is moved into operative relation with the blank and this threader and its actuating devices are of the following construction:

N is a shaft supported in bearings on the frame beside the shaft I and at its end it carries the head N' in which is adjustably secured the tool holder N², in which is secured the threading tool. This shaft at its outer end has sleeved over it, a spiral spring O, which at one end is secured to the end of the shaft and at the other end to the bearing O', this spring having a torsional and longitudinal tension. This spring holds the cutter normally away from the blank. As soon as the cutter M is withdrawn the threading tool is thrown into operation by the cam P on the shaft I, which strikes the finger P' arranged opposite the sleeve Q which forms the movable member of a friction clutch device between that sleeve and the worm wheel Q', journaled on the stub shaft Q² and engaging with a worm R on the outer end of the tubular mandrel C.

R' is a spring between the two members of the clutch to separate them as soon as the pressure on the spring member is released.

S is a crank arm on the sleeve Q having a pin S' at its upper end engaging a slot in the the finger T on the shaft N.

T' is a cam on the shaft I adapted to engage the finger T² on the shaft N, simultaneously with the throwing in of the clutch Q and acting to rock that shaft so that the tool will be moved down upon the work at the same time that the shaft is moved longitudinally through the crank S and behind a wheel Q'. As soon as the shaft begins its longitudinal movement a lug U on the finger T² engages behind the bearing U' on the frame of the machine and holds the tool in engagement with its work, while it cuts the thread the desired length upon the pin. As soon as the cam P passes the finger P' the forward motion of the shaft N ceases and this occurs at the moment when the lug U reaches the end of the bearing U', at which time the torsional tension of the spring O will rock the lug from behind the bearing, and the longitudinal tension of the spring will withdraw the shaft to its initial position.

In the tubular mandrel B is slidingly mounted a shaft V which is actuated from a lever V' which is rocked by means of a cam V² on the shaft G. At the inner end of this shaft V is a boring tool W supported in bearings at the end of the mandrel. As soon as the threading tool leaves the blank the boring tool W is moved into the blank which latter being rapidly rotated will bore into the large end thereof, as shown at W' in Fig. 12. As the boring tool reaches the end of its movement and is withdrawn, the spindle E is simultaneously withdrawn and thus the blank is free to fall from the mandrels which are then rotated to receive a new blank, which in the meantime is fed upon the table or work holder J².

The holding teeth of the mandrel C preferably consist of the longitudinal pins X supported in grooves X' in the end of the mandrel and secured in position by means of the clamping collar X², so that they may be adjusted longitudinally or replaced or sharpened as desired.

What I claim as my invention is—

1. The combination with a sliding rock shaft and means for rocking the shaft, a cutting tool at one end of the shaft, a spring engaging the shaft normally pressing the same in one direction, a rock arm engaging a bearing on the shaft, a clutch for intermittently connecting said arm with a drive wheel to feed the shaft longitudinally against the tension of the spring, and devices for rocking the shaft, substantially as described.

2. In a machine for making insulator pins, the combination of rotating mandrels, having an intermittently reciprocating spindle, an automatic feed table for intermittently delivering the blank to the mandrels, a shaping knife, a grooving tool, and a boring tool, and connected mechanism for automatically moving to bring such tools intermittently and successively to the blank while it is held by the mandrels, substantially as described.

3. In a machine for making insulator pins, the combination of rotating hollow mandrels, an intermittently reciprocating spindle in one mandrel, an intermittently reciprocating boring tool in the other mandrel, shaping and grooving devices for the blank, and connected mechanism for bringing devices successively and intermittently to the blank, substantially as described.

4. The combination with the revolving mandrels, of a rock arm adjacent thereto, a work holder pivotally secured to the arm and extending out at an angle therefrom, means for moving the arm to carry the holder into the path of the revolving work, and yielding means normally retaining the holder in position whereby the holder is permitted to be forced out of engagement with the work by the rotation thereof, substantially as described.

5. The combination with the mandrels, the rock arm I³, a rotating cam for rocking it toward the mandrels, a spring for returning it, a work holder pivoted at the top, the spring J³ frictionally holding the work holder upon its pivot, and the lever L' actuated by the cam, acting to lift the work holder in the return movement of the rock arm, substantially as described.

6. The combination of the shaft N adapted to have a sliding and rotary movement in its bearing, a grooving cutter at one end, a spiral spring on the shaft secured thereto at one end and at the other end to a stationary bearing, a rock arm engaging a slotted bearing on the shaft, a clutch for intermittently connecting said arm with a driven wheel to rock the same and feed the shaft N longitudinally and devices for rocking the shaft N, substantially as described.

7. The combination of the shaft N journaled slidingly and rotatorily in its bearings, the grooving cutter thereon, a spring for returning it to its initial position after each actuation, the slotted arm T on the shaft, the rock arm S engaging therewith, the worm wheel Q', the hub Q adapted to be frictionally connected with the worm wheel, a cam for intermittently coupling the clutch members, the arm $T^2$ on the shaft N, the lug T' on the shaft I' for rocking that arm and shaft and the inclined bearing U' behind which said arm $T^2$ is adapted to travel, substantially as described.

In testimony whereof I affix my signature in presence of two witnesses.

GEORGE R. BUTLER.

Witnesses:
M. B. O'DOGHERTY,
O. F. BARTHEL.